US009798416B2

(12) United States Patent
Hsiao et al.

(10) Patent No.: US 9,798,416 B2
(45) Date of Patent: Oct. 24, 2017

(54) TOUCH DISPLAY DEVICE, DRIVING METHOD THEREOF, AND PRESSURE DETECTION METHOD THEREOF

(71) Applicant: FocalTech Systems, Co. Ltd., Hsinchu (TW)

(72) Inventors: Pei-Hung Hsiao, New Taipei (TW); Yao-Hung Lai, Taichung (TW)

(73) Assignee: Focaltech Systems Co., Ltd., Hsinchu (TW)

( * ) Notice: Subject to any disclaimer, the term of this patent is extended or adjusted under 35 U.S.C. 154(b) by 95 days.

(21) Appl. No.: 15/074,619

(22) Filed: Mar. 18, 2016

(65) Prior Publication Data

US 2017/0068368 A1 Mar. 9, 2017

Related U.S. Application Data

(60) Provisional application No. 62/213,648, filed on Sep. 3, 2015, provisional application No. 62/221,591, filed on Sep. 21, 2015.

(30) Foreign Application Priority Data

Oct. 22, 2015 (TW) .............................. 104134600 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC .................. G06F 3/041; G06F 3/044; G06F 2203/04103; G06F 2203/04105; G06F 2203/04106; G06F 3/0414; G06F 3/0416
See application file for complete search history.

(56) References Cited

U.S. PATENT DOCUMENTS

| 5,241,308 A | 8/1993 | Young | |
|---|---|---|---|
| 6,501,529 B1 * | 12/2002 | Kurihara | ............. G02F 1/13338 345/173 |
| 2010/0123686 A1 | 5/2010 | Klinghult | |
| 2012/0062511 A1 * | 3/2012 | Ishizaki | ................. G06F 3/044 345/174 |
| 2012/0105358 A1 | 5/2012 | Momeyer | |

(Continued)

*Primary Examiner* — Md Saiful A Siddiqui
(74) *Attorney, Agent, or Firm* — Muncy, Geissler, Olds & Lowe, P.C.

(57) ABSTRACT

A touch display device including a pixel array substrate, an opposite substrate, and a display medium layer is provided. The pixel array substrate includes a first substrate and a plurality of sensing electrodes. The first substrate has a plurality of sub-pixel areas arranged in array. The sensing electrodes are disposed on the first substrate and electrically insulated to each other, wherein at least portion of the sensing electrodes cover a number of the sub-pixel areas, respectively. The opposite substrate is opposite to the pixel array substrate and includes a second substrate and a pressure sensing layer. The pressure sensing layer is disposed on a surface of the second substrate facing the pixel array substrate. The display medium layer is located between the sensing electrodes and the pressure sensing layer. A driving method and a pressure detection method of the touch display device are also provided.

17 Claims, 16 Drawing Sheets

(56) References Cited

U.S. PATENT DOCUMENTS

| | | |
|---|---|---|
| 2012/0218199 A1 | 8/2012 | Kim |
| 2014/0008203 A1 | 1/2014 | Nathan |
| 2014/0062933 A1 | 3/2014 | Coulson |
| 2014/0247239 A1* | 9/2014 | Jamshidi-Roudbari ............... G06F 3/0414 345/174 |
| 2015/0130742 A1 | 5/2015 | Chen |
| 2015/0370396 A1 | 12/2015 | Hotelling |
| 2016/0098110 A1* | 4/2016 | Choi .................... G06F 3/0416 345/173 |

* cited by examiner

Providing a touch display device, the touch display device including a pixel array substrate, an opposite substrate and a display medium layer, the pixel array substrate including a first substrate and a plurality of sensing electrodes, the first substrate having a plurality of sub-pixel areas arranged in array, the sensing electrodes including a plurality of touch sensing electrodes and a plurality of first pressure sensing electrodes, the touch sensing electrodes being disposed on the first substrate and electrically insulated from each other, each of the touch sensing electrodes covering a number of the sub-pixel areas, and the first pressure sensing electrodes being disposed on the first substrate and electrically insulated from the touch sensing electrodes, wherein the first pressure sensing electrodes are electrically insulated from each other and cover the sub-pixel areas exposed by the touch sensing electrodes, and the opposite substrate is opposite to the pixel array substrate and includes a second substrate and a pressure sensing layer, wherein the pressure sensing layer is disposed on a surface of the second substrate facing the pixel array substrate, and the display medium layer is located between the sensing electrodes and the pressure sensing layer, wherein the touch display device includes a display mode, a touch sensing mode and a pressure sensing mode ~S110

During a frame period, performing at least one of the display mode, the touch sensing mode and the pressure sensing mode ~S120

FIG. 7

TOUCH DISPLAY DEVICE, DRIVING METHOD THEREOF, AND PRESSURE DETECTION METHOD THEREOF

CROSS-REFERENCE TO RELATED APPLICATION

This application claims the priority benefits of U.S. provisional application Ser. No. 62/213,648, filed on Sep. 3, 2015, U.S. provisional application Ser. No. 62/221,591, filed on Sep. 21, 2015 and Taiwan application serial no. 104134600, filed on Oct. 22, 2015. The entirety of each of the above-mentioned patent applications is hereby incorporated by reference herein and made a part of this specification.

BACKGROUND OF THE INVENTION

1. Field of the Invention

The invention relates to a touch display device, a driving method and a pressure detection method thereof, and more particularly, to a touch display device with pressure sensing capability, a driving method and a pressure detection method thereof.

2. Description of Related Art

Touch display devices can provide users more intuitive and convenient operation experience, and thus have been widely applied to various consumer electronic products, such as an E-book, a smart mobile communication device, a tablet computer and a smart watch, etc. When the user touches on a user interface of the touch display device, the touch display device can select a corresponding displayed item or perform a corresponding operational function according to a 2D coordinate at where an object (a finger or a stylus) is touched on. However, with drastic competitions in the market and availability of wearable touch display devices, determination dimension of the touch display devices must be further improved in order to realize the diverse operational functions.

SUMMARY OF THE INVENTION

A touch display device of the present invention includes a pixel array substrate, an opposite substrate, and a display medium layer. The pixel array substrate includes a first substrate and a plurality of sensing electrodes. The first substrate has a plurality of sub-pixel areas arranged in array. The sensing electrodes are disposed on the first substrate and electrically insulated to each other, wherein at least portion of the sensing electrodes cover a number of the sub-pixel areas, respectively. The opposite substrate is opposite to the pixel array substrate and includes a second substrate and a pressure sensing layer. The pressure sensing layer is disposed on a surface of the second substrate facing the pixel array substrate. The display medium layer is located between the sensing electrodes and the pressure sensing layer.

A driving method of a touch display device of the present invention includes steps as follow. A touch display device is provided. The touch display device includes a pixel array substrate, an opposite substrate, and a display medium layer. The pixel array substrate includes a first substrate and a plurality of sensing electrodes. The first substrate has a plurality of sub-pixel areas arranged in array. The sensing electrodes include a plurality of touch sensing electrodes and a plurality of first pressure sensing electrodes. The touch sensing electrodes are disposed on the first substrate and electrically insulated to each other. Each of the touch sensing electrodes covers a number of the sub-pixel areas. The first pressure sensing electrodes are disposed on the first substrate and electrically insulated from the touch sensing electrodes. The first pressure sensing electrodes are electrically insulated to each other and cover the sub-pixel areas that are exposed by the touch sensing electrodes. The opposite substrate is opposite to the pixel array substrate and includes a second substrate and a pressure sensing layer. The pressure sensing layer is disposed on a surface of the second substrate facing the pixel array substrate. The display medium layer is located between the sensing electrodes and the pressure sensing layer. The touch display device includes a display mode, a touch sensing mode and a pressure sensing mode. During a frame time, at least one of the display mode, the touch sensing mode and the pressure sensing mode is performed.

A pressure detection method of a touch display device of the present invention includes steps as follow. A touch display device is provided. The touch display device includes a pixel array substrate, an opposite substrate, and a display medium layer. The pixel array substrate includes a first substrate and a plurality of sensing electrodes. The first substrate has a plurality of sub-pixel areas arranged in array. The sensing electrodes include a plurality of touch sensing electrodes and a plurality of first pressure sensing electrodes. The touch sensing electrodes are disposed on the first substrate and electrically insulated to each other. Each of the touch sensing electrodes covers a number of the sub-pixel areas. The first pressure sensing electrodes are disposed on the first substrate and electrically insulated from the touch sensing electrodes. The first pressure sensing electrodes are electrically insulated to each other and cover the sub-pixel areas exposed by the touch sensing electrodes. The opposite substrate is opposite to the pixel array substrate and includes a second substrate and a pressure sensing layer. The pressure sensing layer is disposed on a surface of the second substrate facing the pixel array substrate. The display medium layer is located between the sensing electrodes and the pressure sensing layer. When a pressure is applied to the touch display device, a pitch variation between the first pressure sensing electrodes and the pressure sensing layer is calculated according to a capacitance variation between each of the first pressure sensing electrodes and the pressure sensing layer. The pressure applied to each of the first pressure sensing electrodes at corresponding positions on the touch display device is calculated according to the pitch variation.

Based on the above, the touch display device of the present invention is capable of determining 2D touch coordinate and calculating the pressure applied to the touch display device by disposing the sensing electrodes and the pressure sensing layer, so as to achieve the 3D touch sensing. In addition, the present invention further provides the driving method and the pressure detection method of the touch display device.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1E' is a top view illustrating another embodiment of the opposite substrate in FIG. 1E.

FIG. 7 is a flowchart of a driving method of a touch display device according to an embodiment of the present invention.

DESCRIPTION OF THE EMBODIMENTS

Figure 1A:
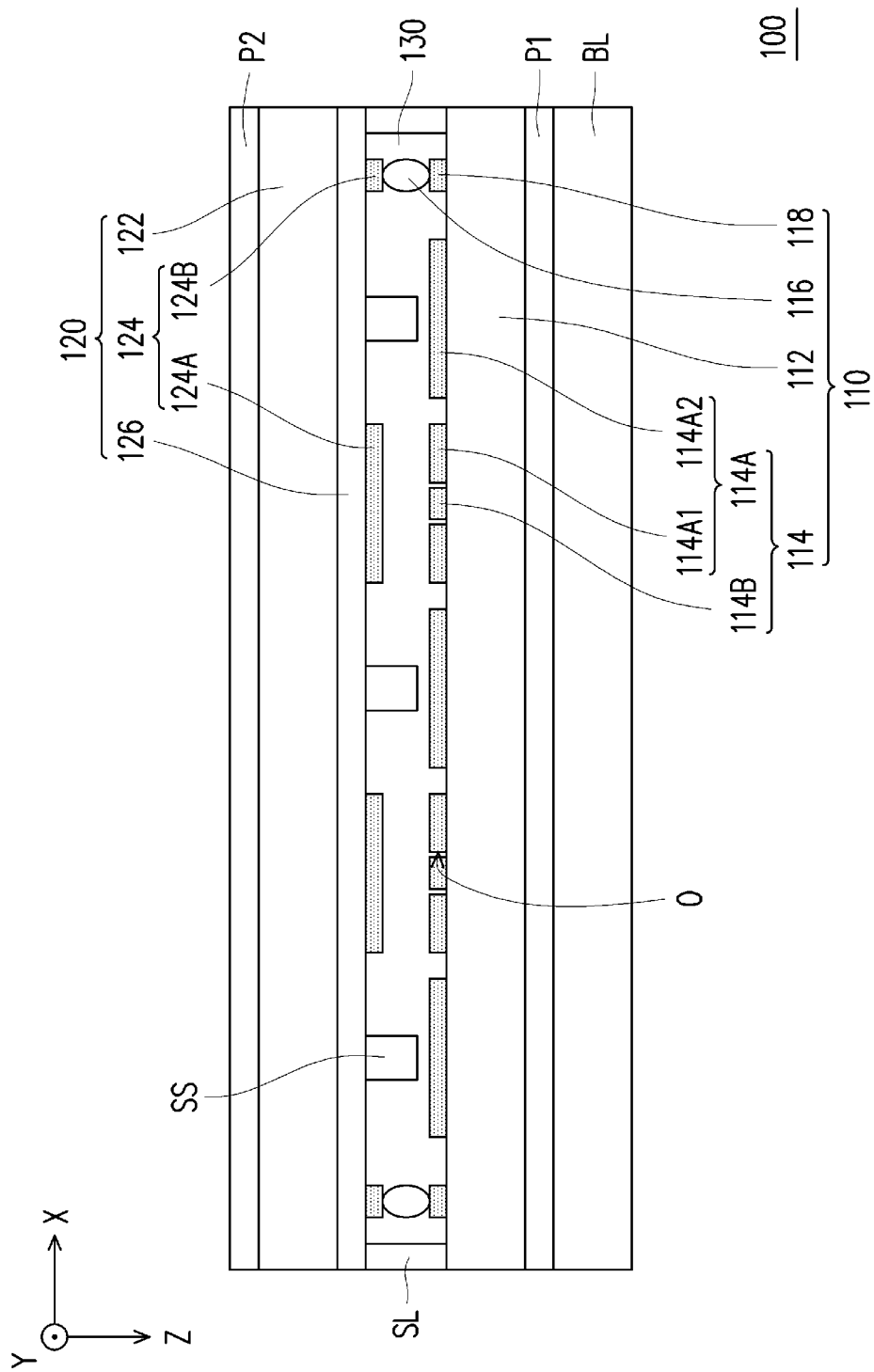
FIG. 1A is a cross-sectional view illustrating a touch display device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
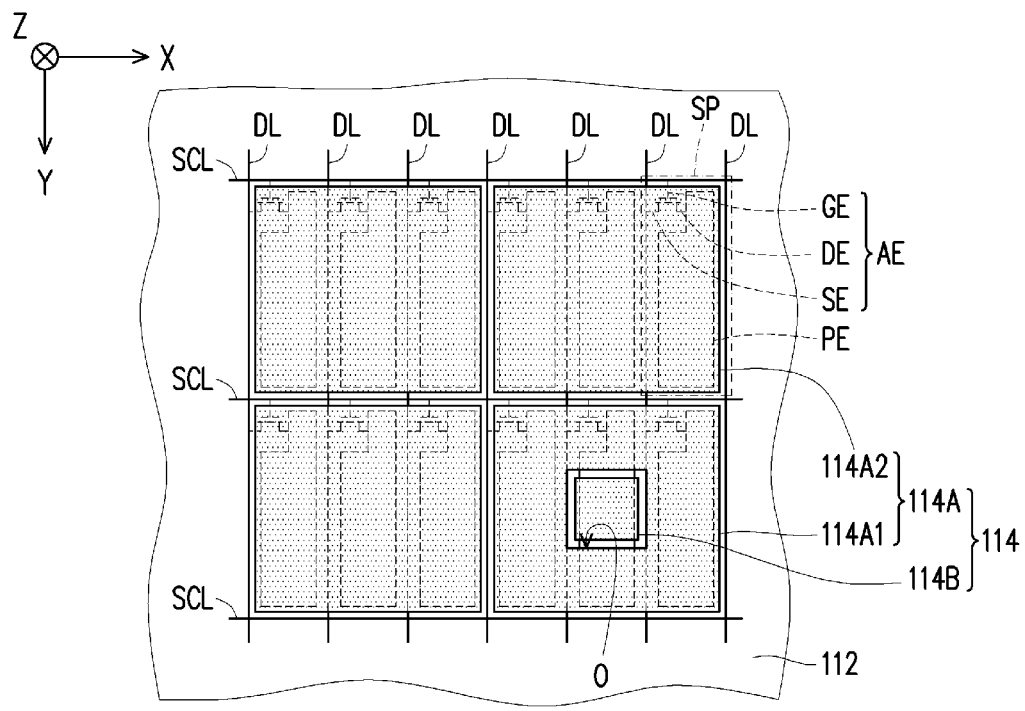
FIG. 1B is a local top view of a pixel array substrate in FIG. 1A.
Figure 1C:
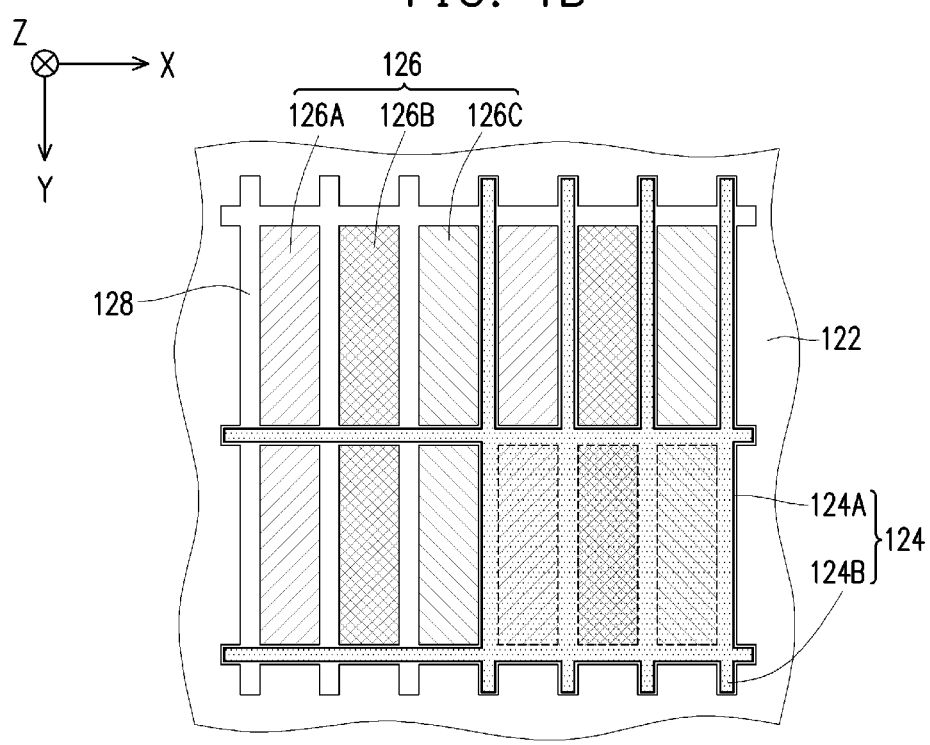
FIG. 1C is a local top view of an opposite substrate in FIG. 1A.
Figure 1D:
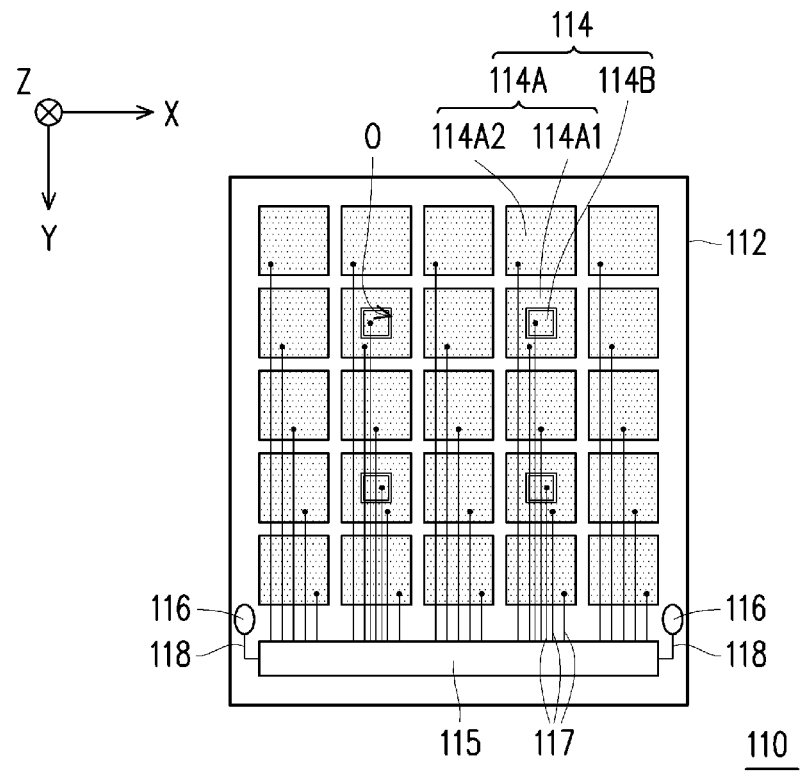
FIG. 1D is a top view illustrating a first type of the pixel array substrate in FIG. 1A.
Figure 1E:
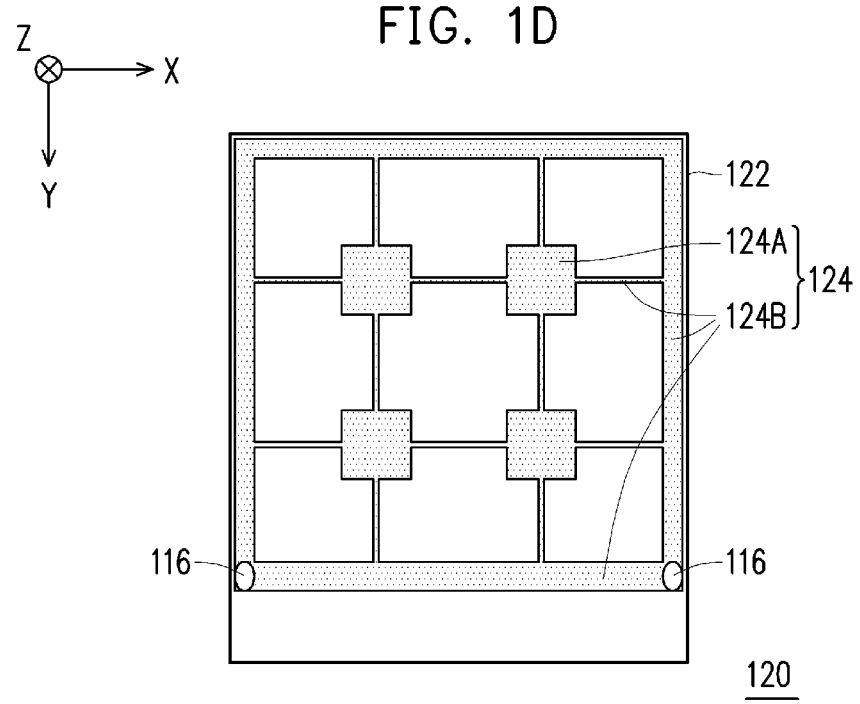
FIG. 1E is a top view illustrating a first type of the opposite substrate in FIG. 1A.
Figure 1E:
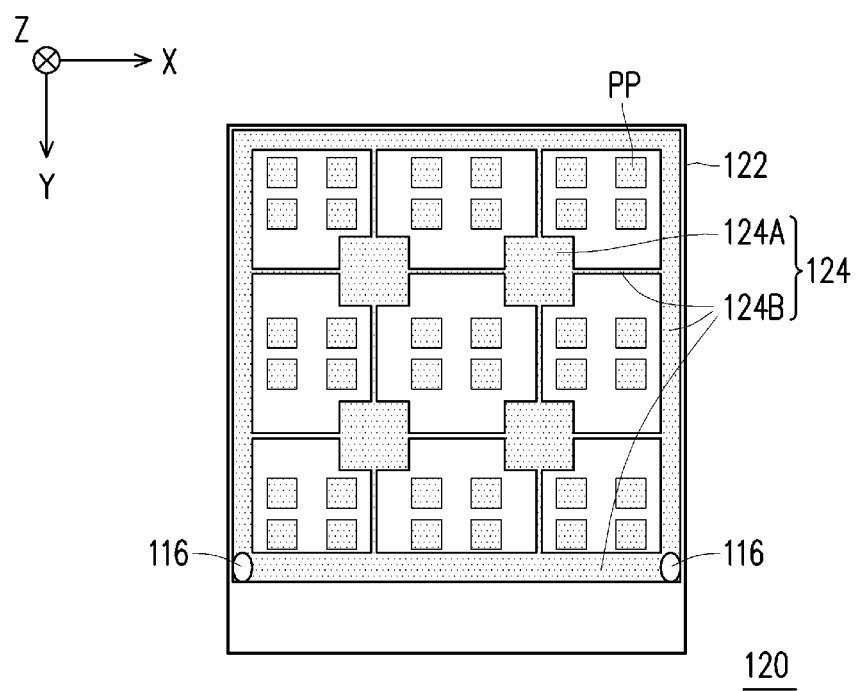
Figure 2:
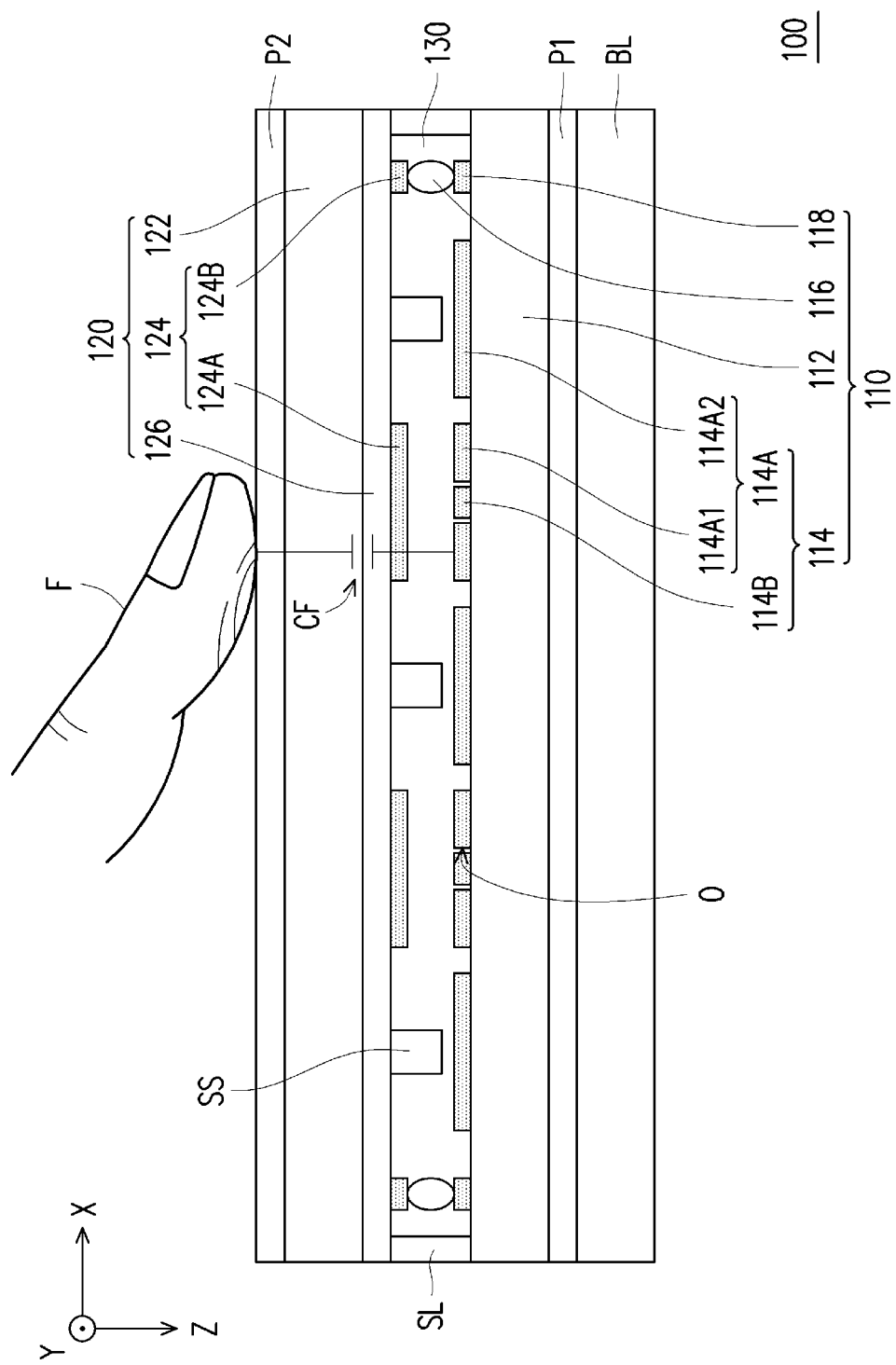
FIG. 2 and FIG. 3 are schematic diagrams respectively illustrating a touch sensing mode and a pressure sensing mode of the touch display device according to one embodiment of the present invention.
Figure 3:
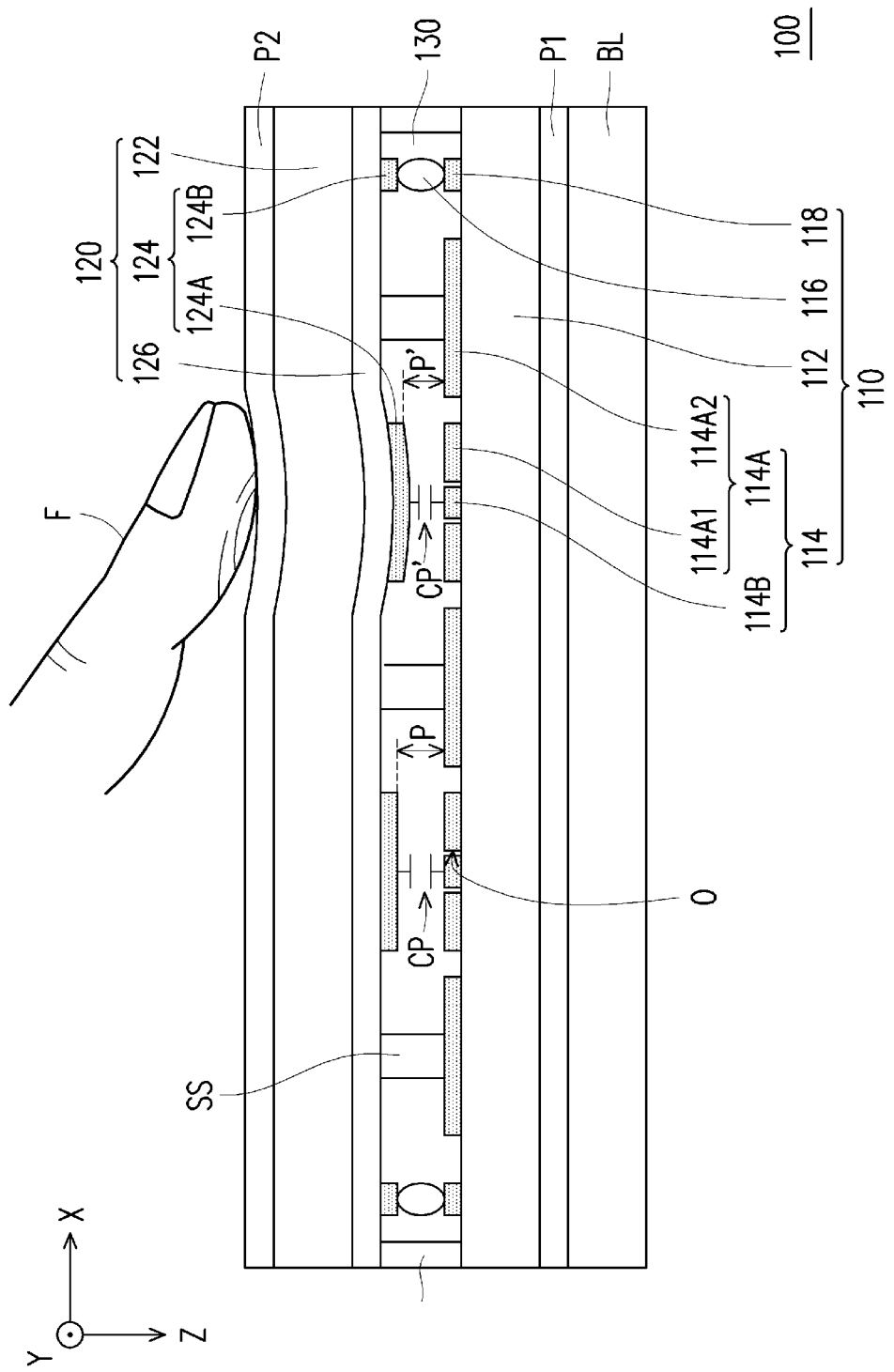

FIG. 1A is a cross-sectional view illustrating a touch display device according to an embodiment of the present invention. FIG. 1B is a local top view of a pixel array substrate in FIG. 1A. FIG. 1C is a local top view of an opposite substrate in FIG. 1A. FIG. 1D is a top view illustrating a first type of the pixel array substrate in FIG. 1A. FIG. 1E is a top view illustrating a first type of the opposite substrate in FIG. 1A. FIG. 1E' is a top view illustrating another embodiment of the opposite substrate in FIG. 1E. FIG. 2 and FIG. 3 are schematic diagrams respectively illustrating a touch sensing mode and a pressure sensing mode of the touch display device according to one embodiment of the present invention.

Referring to FIG. 1A, a touch display device 100 includes a pixel array substrate 110, an opposite substrate 120 and a display medium layer 130. The pixel array substrate 110 includes a first substrate 112 and a plurality of sensing electrodes 114. The first substrate 112 is adapted to carry the sensing electrodes 114. For example, the first substrate 112 may be, but not limited to, a glass substrate or a plastic substrate.

Referring to FIG. 1B, the first substrate 112 has a plurality of sub-pixel areas SP arranged in array (only one of the sub-pixel areas is schematically marked, SP, in FIG. 1B). Specifically, the pixel array substrate 110 may further include a plurality of scan lines SCL, a plurality of data lines DL, a plurality of active devices AE and a plurality of pixel electrodes PE. The scan lines SCL, the data lines DL, the active devices AE and the pixel electrodes PE are disposed on a surface of the first substrate 112 facing the opposite substrate 120. The scan lines SCL and the data lines DL are intersected to form a plurality of sub-pixel areas SP arranged in array. In order to structurally separate the scan lines SCL from the data lines DL and maintain their own independent electric property, the pixel array substrate 110 may further include a gate insulating layer (not illustrated), which is disposed between the scan lines SCL and the data lines DL.

Each of the active devices AE is located in one of the sub-pixel areas SP and electrically connected to the corresponding scan line SCL and the corresponding data line DL. More specifically, each of the active devices AE may include a gate electrode GE, a channel layer (not illustrated), a source electrode SE and a drain electrode DE. The gate electrode GE is electrically connected to the corresponding scan line SCL, and the source electrode SE is electrically connected to the corresponding data line DL. The gates electrode GE and the scan lines SCL may be disposed on the same layer (hereinafter, also known as a first layer), which means that the gate electrodes GE and scan lines SCL may be formed by the same manufacturing process at the same time. On the other hand, the source electrodes SE, the drain electrodes DE and the data lines DL may be disposed on the same layer (hereinafter, also known as a second layer), which means that the source electrodes SE, the drain electrodes DE and the data lines DL may be formed by the same manufacturing process at the same time. Considering capabilities of the scan line SCL and the data line DL in terms of signal transmission, materials of the first layer and the second layer may be metal.

Each of the pixel electrodes PE is located in one of the sub-pixel areas SP and electrically connected to the corresponding active device AE. In one embodiment, the pixel array substrate 110 may further include an overcoating layer (not illustrated), and the overcoating layer covers the active device AE in order to provide a flat carrying surface for the pixel electrodes PE. The overcoating layer has a plurality of openings. Each of the openings exposes the drain electrode DE. The pixel electrode PE is disposed on the overcoating layer and electrically connected to the corresponding drain electrode DE through the opening. Considering an open ratio of the touch display device 100, a material of the pixel electrode PE may be transparent conductive material, such as metal-oxide including, but not limited to, indium tin oxide, indium oxide or tin oxide.

It should be noted that, shape, amounts, processing sequences or the disposing relation between the elements in the sub-pixel area SP (e.g., the active device AE and the pixel electrode PE) may be changed according to design requirements. The above description and FIG. 1B are exemplary and not used to limit the present invention. For example, each of the pixel electrodes PE may be, but not limited to, a comb electrode.

The sensing electrodes 114 are disposed on the first substrate 112 and electrically insulated from each other. In this embodiment, the sensing electrodes 114 may be located on the active devices AE and the pixel electrodes PE, so that the active devices AE and the pixel electrodes PE may be located between the sensing electrodes 114 and the first substrate 112. However, the stack sequence of the pixel electrodes PE and the sensing electrodes 114 is not limited to the above. Further, the pixel array substrate 110 may further include a dielectric layer (not illustrated), which is disposed between the pixel electrodes PE and the sensing electrodes 114, so that the sensing electrodes 114 and the pixel electrodes PE are electrically insulated from each other.

Referring to FIG. 1B and FIG. 1D, among the sensing electrodes 114, at least portion of the sensing electrodes 114 cover a number of the sub-pixel areas SP, respectively. Specifically, the sensing electrodes 114 may include a plurality of touch sensing electrodes 114A and a plurality of first pressure sensing electrodes 114B. The touch sensing electrodes 114A are electrically insulated from each other to maintain their own independent electric property. Further, each of the touch sensing electrodes 114A covers the number of the sub-pixel areas SP. In this embodiment, each of the touch sensing electrodes 114A covers three sub-pixel areas SP. However, the number of the sub-pixel areas SP covered by each of the touch sensing electrodes 114A may be changed according to requirements for the touch sensibility and is not limited by FIG. 1D.

The first pressure sensing electrodes 114B are electrically insulated from the touch sensing electrodes 114A, and the first pressure sensing electrodes 114B are electrically insulated from each other to maintain their own independent electric property. Further, the first pressure sensing electrodes 114B may cover the sub-pixel areas SP exposed by the touch sensing electrodes 114A. Specifically, the touch sensing electrodes 114A include a plurality of first touch sensing electrodes 114A1 and a plurality of second touch sensing electrodes 114A2. The first touch sensing electrodes 114A1 and the second touch sensing electrodes 114A2 are electrically insulated from each other and not overlapped with each other. Each of the first touch sensing electrodes 114A1 has an opening O. Each of the openings O exposes at least partial area of at least one of the sub-pixel areas SP. Although FIG. 1B illustrates that each of the openings O partially exposes the middle area of one of the sub-pixel areas SP, it is exemplary and not limited to the present invention. Each of the first pressure sensing electrodes 114B is disposed within one of the openings O, and covers the sub-pixel area SP exposed by the corresponding opening O. Although FIG. 1D illustrates that each of the openings O is located at the center of the corresponding first touch sensing electrode 114A1 so that each of the first touch sensing electrodes 114A1 surrounds four sides of the corresponding first pressure sensing electrode 114B, it is exemplary and not limited to the present invention. In another embodiment, each of the openings O may also be located at the corner or edge of the corresponding first touch sensing electrodes 114A1. Each of the first pressure sensing electrodes 114B may also be surrounded by one of the first touch sensing electrodes 114A1, and electrically insulated from each other by a pitch, as shown in FIG. 1A, FIG. 1B and FIG. 1D.

Referring back to FIG. 1A, the opposite substrate 120 is opposite to the pixel array substrate 110 and includes a second substrate 122 and a pressure sensing layer 124. The second substrate 122 is adapted to carry the pressure sensing layer 124. For example, the second substrate 122 may be, but not limited to, a glass substrate or a plastic substrate.

Referring to FIG. 1A, FIG. 1C and FIG. 1E, the pressure sensing layer 124 is disposed on a surface of the second substrate 122 facing the pixel array substrate 110. In this embodiment, the pressure sensing layer 124 is a patterned electrode layer, which includes a plurality of second pressure sensing electrodes 124A and a plurality of connection portions 124B. Each of the second pressure sensing electrodes 124A is disposed corresponding to one of the sensing electrodes 114, and for example, each of the second pressure sensing electrodes 124A is disposed corresponding to one of the first pressure sensing electrodes 114B. The connection portions 124B connect each of the second pressure sensing electrodes 124A (referring to FIG. 1E) so that the second pressure sensing electrodes 124A are electrically connected to constitute the pressure sensing layer 124. Considering the aperture ratio of the touch display device 100, the pressure sensing layer 124 may be made of transparent conductive material, such as metal-oxide including, but not limited to, indium tin oxide, indium oxide or tin oxide. In this embodiment, as shown in FIG. 1C, the connection portions 124B may be disposed corresponding to a black matrix 128, and the second pressure sensing electrodes 124A may cover a plurality of color filter patterns. In one embodiment, the pressure sensing layer 124 may also be, for example, a metal mesh, and more preferably, a nano-silver wire.

Referring to FIG. 1A and FIG. 1C, the opposite substrate 120 may further include a color filter layer 126. The color filter layer 126 is disposed on the second substrate 122 and located between the second substrate 122 and the pressure sensing layer 124, but the invention is not limited thereto. In another embodiment, the color filter layer 126 may also be disposed on the first substrate 112.

Referring to FIG. 1C, the color filter layer 126 may include a plurality of first, second and third color filter patterns 126A, 126B and 126C and each pattern has color in red, green and blue, respectively. It is understood that color, amount and arrangement of the color filter layer 126 in FIG. 1C is exemplary and not used to limit the present invention.

The opposite substrate 120 may further include the black matrix 128 for hiding elements, which are not intended to be visible, in the touch display device 100. For instance, the black matrix 128 may be disposed corresponding to the scan lines SCL and the data lines DL. In an embodiment, the black matrix 128 may further cover the active devices AE.

It is worth mentioning that, the first pressure sensing electrodes 114A and the second pressure sensing electrodes 124A may be disposed correspondingly. Design parameters regarding amounts and disposition positions of the pressure sensing electrodes may be increased or decreased according to requirements for pressure sensing sensitivity. In one embodiment, the first pressure sensing electrodes 114A and the second pressure sensing electrodes 124A may also be disposed corresponding to the black matrix 128, so as to enhance a visual effect of the touch display device 100.

With the dispositions of the sensing electrodes 114 and the pressure sensing layer 124, the touch display device 100 is capable of performing a touch sensing mode and a pressure sensing mode. Referring to FIG. 2 and FIG. 3, in the touch sensing mode, the first touch sensing electrodes 114A1 and the second touch sensing electrodes 114A2 may determine the 2D coordinate (i.e., a coordinate in directions X and Y) at where the touch display device 100 is touched on by an object in a manner of self-capacitance sensing. When the object (e.g., a finger F) touches on the touch display device 100, a capacitance CF is generated between the finger F and the corresponding touch sensing electrode 114A (at least one of the first touch sensing electrodes 114A1 and the second touch sensing electrodes 114A2), so that the touch display device 100 can determine the 2D coordinate of the touched place by the object according to the capacitance variation. On the other hand, in the pressure sensing mode, the first pressure sensing electrodes 114B and the second pressure sensing electrodes 124A may be used to determine a pressure applied to the touch display device 100 by the object. As shown in FIG. 3, for example, when the finger F presses on the touch display device 100, because a pressure is applied to the touch display device 100, a pitch between the first pressure sensing electrodes 114B and the second pressure sensing electrodes 124A is changed (e.g., changed from pitch P into pitch P') to cause the capacitance variation (e.g., changed from capacitance CP into capacitance CP') between the first pressure sensing electrodes 114B and the second pressure sensing electrodes 124A, so that the touch display device 100 can detect the pressure applied to the touch display device 100 (i.e., a variation (e.g., a pressure value) in direction Z may be sensed) according to the capacitance variation (the detailed pressure detection method will be described later). Therefore, the touch display device 100 is capable of determining 2D touch coordinate and calculates the pressure applied to the touch display device 100 by the sensing electrodes 114 and the pressure sensing layer 124, so as to achieve 3D touch sensing.

Considering qualities of touch sensing and pressure sensing, a ratio of an area of each the second pressure sensing electrode 124A to an area of the corresponding first pressure sensing electrode 114B falls within a range between 100% and 500% in this embodiment. Further, a ratio of an area of each first pressure sensing electrode 114B to an area of each first touch sensing electrode 114A1 falls within a range between 0.01% and 15%. In addition, a ratio of the total area of the first pressure sensing electrodes 114B to the total area of the first touch sensing electrodes 114A1 and the second touch sensing electrodes 114A2 falls within a range between 0.01% and 15%.

Referring to FIG. 1A, FIG. 1B, FIG. 1D and FIG. 1E, the pixel array substrate 110 may further include a control circuit 115, at least one conductor 116, a plurality of first conductive lines 117 and at least one second conductive line 118, so as to control the scan lines SCL, the data lines DL, the first touch sensing electrodes 114A1, the second touch sensing electrodes 114A2, the first pressure sensing electrodes 114B and the second pressure sensing electrodes 124A.

In one embodiment, the control circuit 115 is disposed on the first substrate 112, and includes an integrated control circuit (Integrated Driver & Controller; IDC), which is configured to perform a display mode, a touch sensing mode and a pressure sensing mode. In other words, the integrated control circuit is electrically connected to the scan lines SCL, the data lines DL, the first touch sensing electrodes 114A1, the second touch sensing electrodes 114A2, the first pressure sensing electrodes 114B and the second pressure sensing electrodes 124A.

The conductor 116 is disposed between the first substrate 112 and the second substrate 122, and electrically connected to the pressure sensing layers 124. For instance, the conductor 116 may be in direct contact with the connection portions 124B of the pressure sensing layer 124, but the present invention is not limited thereto. The conductor 116 may be, but not limited to, a silver paste.

The first conductive lines 117 are disposed on the first substrate 112, and each of the first conductive lines 117 connects each sensing electrode 114 (including the first touch sensing electrode 114A1, the second touch sensing electrodes 114A2 and the first pressure sensing electrodes 114B) to the control circuit 115. In other words, each of the sensing electrodes 114 can be driven independently by the control circuit 115. Considering capabilities of the first conductive lines 117 in terms of signal transmission, the first conductive lines 117 may be made of metal. To prevent the visual effect of the touch display device 100 from being affected by the first conductive lines 117, the first conductive lines 117 may be correspondingly disposed underneath the black matrix 128 in FIG. 1C. In one embodiment, the first conductive lines 117 may be made of the same layer as the source electrodes SE, the drain electrodes DE and the data lines DL, and each of the sensing electrodes 114 may be connected to the corresponding first conductive line 117 through a via hole (not illustrated), but the invention is not limited thereto. In another embodiment, the first conductive lines 117 may be formed on the sensing electrodes 114, and the pixel array substrate 110 may further include an insulating layer disposed between the sensing electrodes 114 and the first conductive lines 117, so that the sensing electrodes 114 and the first conductive lines 117 are structurally separated to maintain their own independent electric property.

The second conductive lines 118 are disposed on the first substrate 112, and each of the second conductive lines 118 connects one of the at least one conductor 116 to the control circuit 115 so that the pressure sensing layer 124 is electrically connected to the control circuit 115. Considering capabilities of the second conductive lines 118 in terms of signal transmission, the second conductive lines 118 may be made of metal. Further, to prevent the visual effect of the touch display device 100 from being affected by the second conductive lines 118, the second conductive lines 118 may be correspondingly disposed underneath the black matrix 128 in FIG. 1C. It should be noted that, amounts and disposition positions of the conductors 116 and the second conductive lines 118 may be changed based on design requirements and the present invention is not limited by FIG. 1A. Furthermore, floating electrode patterns PP may also be formed on the second substrate 122 and at the areas where are not covered by the second pressure sensing electrodes 124A and the connection portions 124B, as shown in FIG. 1E'.

Referring back to FIG. 1A, the display medium layer 130 is located between the sensing electrodes 114 and the pressure sensing layer 124. For instance, the display medium layer 130 may be a liquid crystal layer. The liquid crystal layer may include a plurality of liquid crystal molecules. The liquid crystal molecules may be positive liquid crystal molecules or negative liquid crystal molecules. Because the liquid crystal layer is non-self-illuminating material, the touch display device 100 may further include a backlight module BL to provide a planar light source required for displaying. However, the present invention is not limited to be applied to non-self-illuminating display devices. It can be understood by persons skilled in art that, the present invention may also be applied to self-illuminating display devices such as an organic electroluminescence device (OLED).

Further, the touch display device 100 may further include a sealant SL, sub photo-spacers SS, a first polarizer P1 and a second polarizer P2. The sealant SL is located between the first substrate 112 and the second substrate 122 and surrounds the display medium layer 130, so as to seal the display medium layer 130 between the first substrate 112 and the second substrate 122. The sub photo-spacers SS are disposed on the second substrate 122 and keep a distance away from the sensing electrodes 114 in direction Z. When the pressure is applied to the touch display device 100 (referring to FIG. 3), the disposition of the sub photo-spacer SS can ensure that a distance is kept between the first substrate 112 and the second substrate 122, so as to avoid short circuit caused by the conductive layers (e.g., the sensing electrodes 114 and the pressure sensing layer 124)

on the two substrates in contact with each other. In FIG. 1A, the sub photo-spacer SS and the pressure sensing layer 124 are not overlapped with each other, but is exemplary and not used to limit the present invention. In another embodiment, the pressure sensing layer 124 may be partially overlapped with the sub photo-spacers SS, and an overlapped portion of the pressure sensing layer 124 and the sub photo-spacers SS is located between the sub photo-spacers SS and the second substrate 122. The first polarizer P1 is disposed on a surface of the first substrate 112 facing away from the opposite substrate 120, and the second polarizer P2 is disposed on a surface of the second substrate 122 facing away from the pixel array substrate 110. It can be understood that, the touch display device 100 may also include at least one main photo spacer, which is located between the first substrate 112 and the second substrate 122, and configured to maintain a cell gap between the two substrates. Moreover, when the pressure is applied to the touch display device 100, the sub photo-spacer SS may be used to maintain the cell gap between the two substrates.

Figure 4:
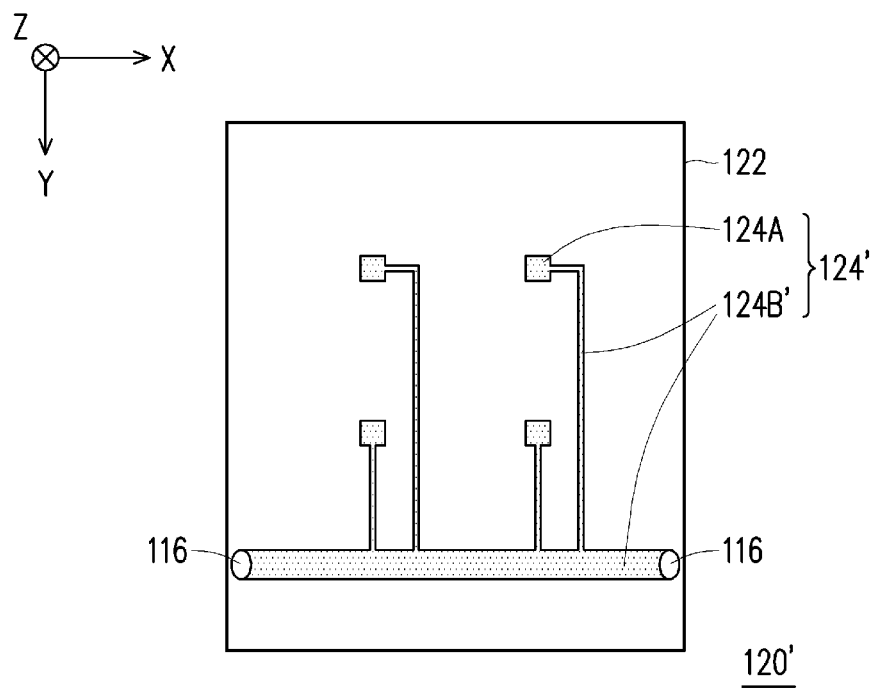
FIG. 4 is a top view illustrating a second type of the opposite substrate in FIG. 1A.
Figure 5:
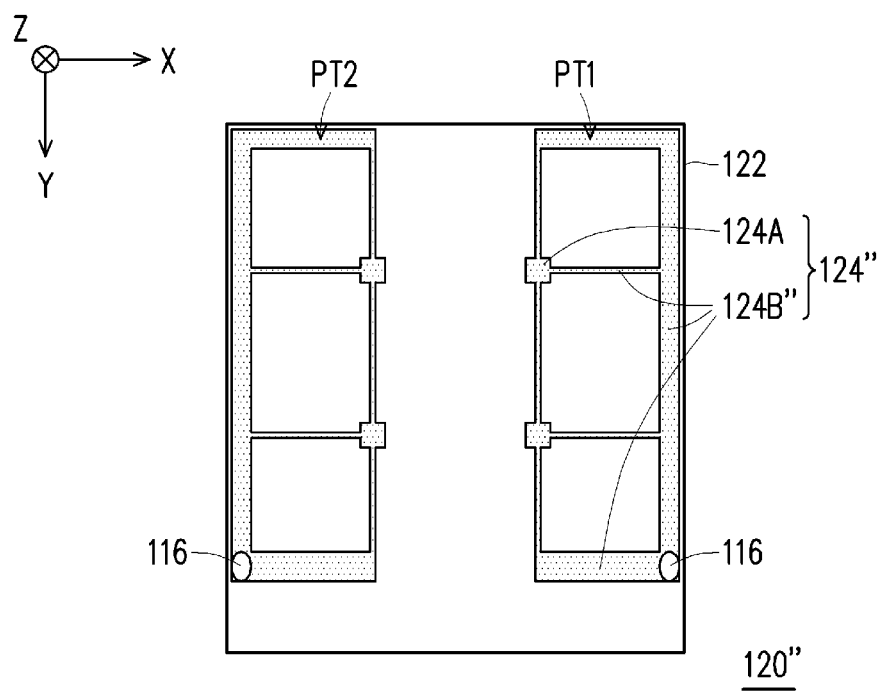
FIG. 5 is a top view illustrating a third type of the opposite substrate in FIG. 1A.
Figure 6A:
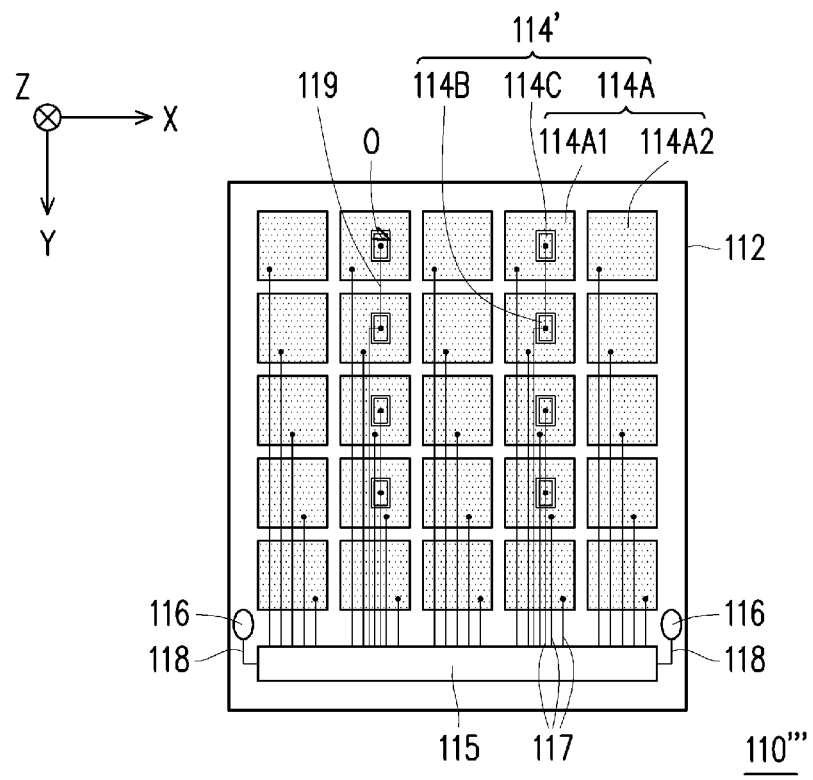
FIG. 6A and FIG. 6B are top views respectively illustrating other types of the pixel array substrate and the opposite substrate in FIG. 1A.
Figure 6B:
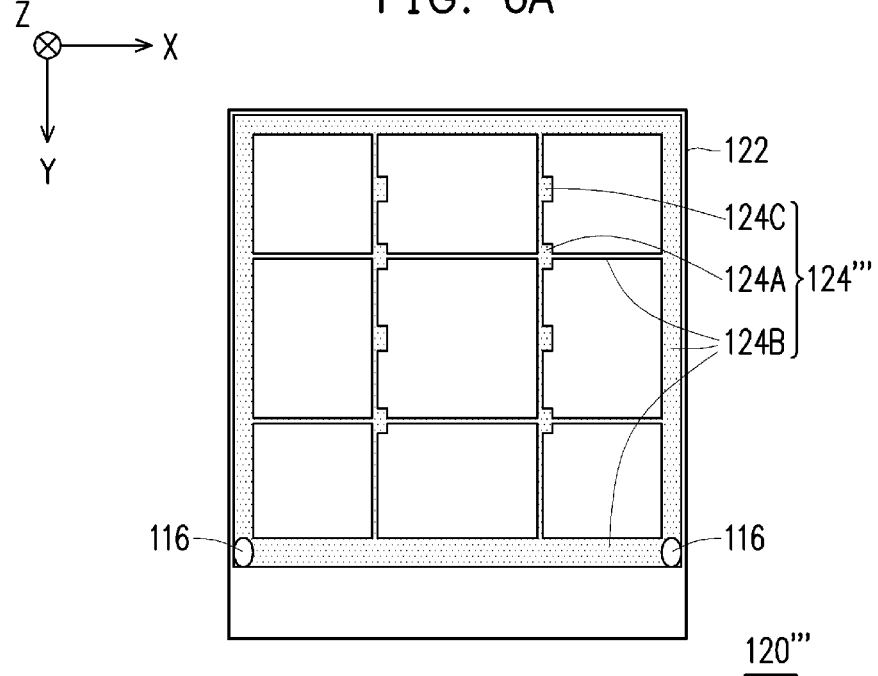

Other various embodiments of the pixel array substrate and the opposite substrate are described below with reference to FIG. 4 to FIG. 6, but they are not used to limit the present invention. FIG. 4 is a top view illustrating a second type of the opposite substrate in FIG. 1A. FIG. 5 is a top view illustrating a third type of the opposite substrate in FIG. 1A. FIG. 6A and FIG. 6B are top views respectively illustrating other types of the pixel array substrate and the opposite substrate in FIG. 1A.

Referring to FIG. 4 and FIG. 5, opposite substrates 120' and 120" are similar to the opposite substrate 120 of FIG. 1E, and the same elements are indicated by the same reference numbers, which are not repeated hereinafter. A major difference between the opposite substrates 120' and 120" and the opposite substrate 120 is a graphical design of the connection portions 124B, 124B' and 124B" of the pressure sensing layers 124, 124' and 124". In FIG. 1E (or FIG. 4), the connection portions 124B (or the connection portions 124B') connect all the second pressure sensing electrodes 124A together, whereas the connection portions 124B" merely connect a part of the second pressure sensing electrodes 124A together in FIG. 5. As such, the pressure sensing layer 124" has pressure patterns PT1 and PT2 which are structurally separated, and the pressure patterns PT1 and PT2 are electrically connected to the control circuit 115 in FIG. 1D through the different conductors 116 (and the second conductive lines 118 in FIG. 1D), respectively.

Referring to FIG. 6A and FIG. 6B, a pixel array substrate 110 is similar to the pixel array substrate 110 in FIG. 1D, and an opposite substrate 120''' is similar to the opposite substrate 120 in FIG. 1E. Herein, the same elements are indicated by the same reference numbers, which are not repeated hereinafter. A major difference between the two is that the pixel array substrate 110''' further includes a plurality of third pressure sensing electrodes 114C and a plurality of third conductive lines 119. Each of the third pressure sensing electrodes 114C is disposed in the opening O of one of the first touch sensing electrodes 114A1, and each of the third conductive lines 119 connects one of the third pressure sensing electrodes 114C to one of the first pressure sensing electrodes 114B. In other words, each of the third pressure sensing electrodes 114C is electrically connected to the control circuit 115 through the corresponding third conductive line 119, the corresponding first pressure sensing electrode 114B and the corresponding first conductive line 117. On the other hand, the opposite substrate 120''' further includes a plurality of fourth pressure sensing electrodes 124C. Each of the fourth pressure sensing electrodes 124C is disposed corresponding to one of the third pressure sensing electrodes 114C, and is electrically connected to the second pressure sensing electrode 124A through the connection portion 124B.

A driving method of the touch display device is described below with reference to FIG. 7 to FIG. 14. FIG. 7 is a flowchart of a driving method of a touch display device according to an embodiment of the present invention. FIG. 8 to FIG. 14 are schematic diagrams illustrating the driving method of the touch display device according to FIG. 7. Referring to FIG. 7, the driving method of the touch display device includes the following steps. A touch display device (e.g., a touch display device 100 in FIG. 1A) is provided (step S110). The touch display device 100 includes a pixel array substrate 110, an opposite substrate 120 and a display medium layer 130. The pixel array substrate 110 includes a first substrate 112 and a plurality of sensing electrodes 114. The first substrate 112 has a plurality of sub-pixel areas SP arranged in array (referring to FIG. 1B). The sensing electrodes 114 include a plurality of touch sensing electrodes 114A and a plurality of first pressure sensing electrodes 114B. The touch sensing electrodes 114A are disposed on the first substrate 112 and electrically insulated from each other. Each of the touch sensing electrodes 114A covers a number of the sub-pixel areas SP. The first pressure sensing electrodes 114B is disposed on the first substrate 112 and electrically insulated from the touch sensing electrodes 114A. The first pressure sensing electrodes 114B are electrically insulated from each other and cover the sub-pixel areas SP exposed by the touch sensing electrodes 114A. The opposite substrate 120 is opposite to the pixel array substrate 110 and includes a second substrate 122 and a pressure sensing layer 124. The pressure sensing layer 124 is disposed on a surface of the second substrate 122 facing the pixel array substrate 110. The display medium layer 130 is located between the sensing electrodes 114 and the pressure sensing layer 124. The touch display device 100 includes a display mode, a touch sensing mode and a pressure sensing mode. During a frame period, at least one of the display mode, the touch sensing mode and the pressure sensing mode is performed (step S120).

Specifically, during the frame period, the touch display device 100 may perform one of the display mode, the touch sensing mode and the pressure sensing mode, or perform two or all of the display mode, the touch sensing mode and the pressure sensing mode. Various embodiments are provided below as examples with reference to FIG. 8 to FIG. 14, but the present invention is not limited only to the embodiments of FIG. 8 to FIG. 14.

Figure 8:
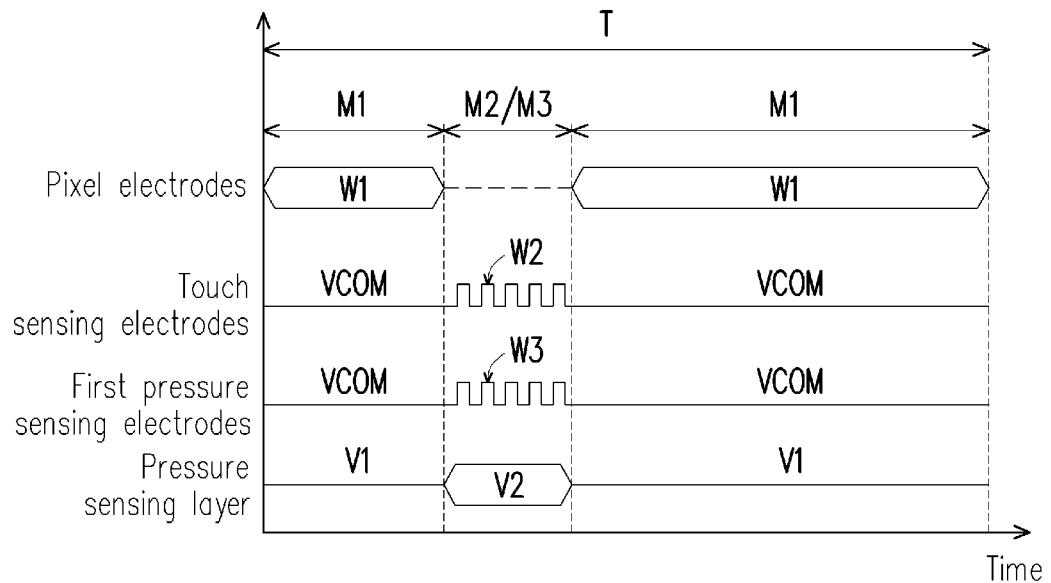
FIGS. 8-14 are schematic diagrams illustrating the driving method of the touch display device according to FIG. 7.

Referring to FIG. 1 and FIG. 8, during a frame period T (e.g., 1/60 second), the display mode M1 may be performed twice, and the touch sensing mode M2 and the pressure sensing mode M3 may be respectively performed once. The touch sensing mode M2 and the pressure sensing mode M3 may be performed simultaneously, and the touch sensing mode M2 and the pressure sensing mode M3 may be performed between the two display modes M1. It can be understood that, in this embodiment, the touch sensing mode M2 and the pressure sensing mode M3 may be performed simultaneously but not between two display modes M1. In other words, the touch sensing mode M2 and the pressure sensing mode M3 may be performed simultaneously and individually without performing the display mode M1.

A method of performing the display mode M1 includes: providing a common voltage VCOM to the first pressure sensing electrodes 114B and the touch sensing electrode 114A (including the first touch sensing electrodes 114A1 and the second touch sensing electrodes 114A2); and providing a constant voltage V1 to the pressure sensing layer 124, but the invention is not limited thereto. In another embodiment, the pressure sensing layer 124 may also be floating.

In addition, the method of performing the display mode M1 may further include: sequentially providing a display driving waveform W1 to the pixel electrodes PE in FIG. 1B. By modulating a voltage bias between the sensing electrodes 114 and the pixel electrodes PE (referring to FIG. 1B), an orientation of the liquid crystal molecules in the display medium layer 130 may be controlled, so that the touch display device 100 can display a frame having different gray-scale values with collocation of the first polarizer P1 and the second polarizer P2.

Figure 9:
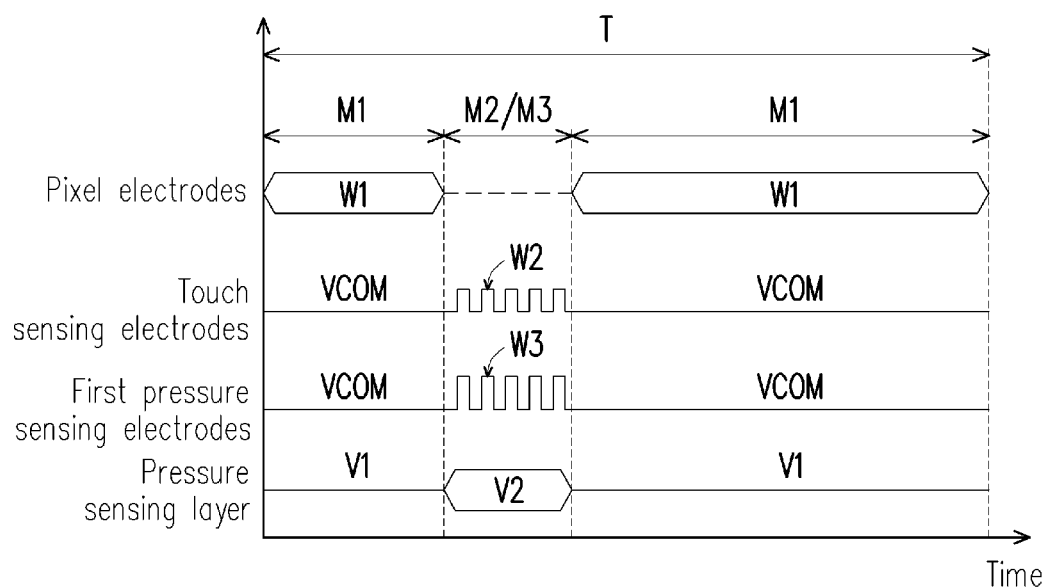

A method of simultaneously performing the touch sensing mode M2 and the pressure sensing mode M3 includes: providing driving waveforms W2 and W3 with the same phase to the touch sensing electrodes 114A and the first pressure sensing electrodes 114B, wherein the driving waveforms W2 and W3 may include the same level (e.g., as shown in FIG. 8) or different levels (e.g., as shown in FIG. 9); and providing a constant voltage V2 to the pressure sensing layer 124, wherein the constant voltage V2 may be different from the constant voltage V1. In another embodiment, the constant voltages V1 and V2 may be identical.

Further, the method of simultaneously performing the touch sensing mode M2 and the pressure sensing mode M3 may also include: floating the pixel electrodes PE in FIG. 1B (the floating state is represented in dotted lines) in order to stop updating a display frame.

Figure 10:
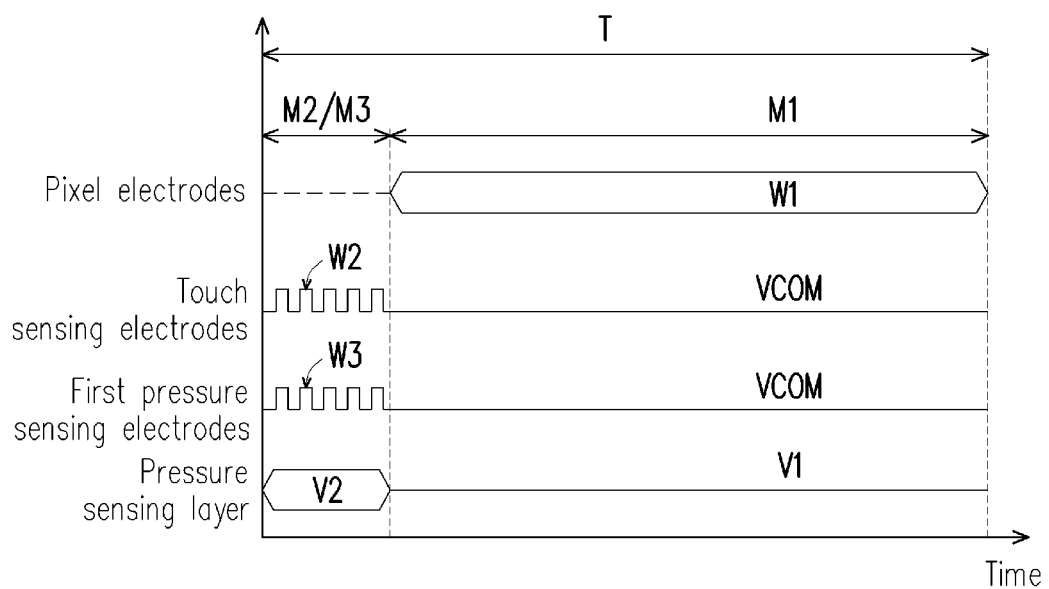

Referring to FIG. 10, during the frame period T, each of the display mode M1, the touch sensing mode M2 and the pressure sensing mode M3 may also be performed once. The touch sensing mode M2 and the pressure sensing mode M3 may be performed simultaneously, and the touch sensing mode M2 and the pressure sensing mode M3 may be performed before or after performing the display modes M1. Herein, a method of performing the display mode M1 and a method of simultaneously performing the touch sensing mode M2 and the pressure sensing mode M3 may refer to the foregoing embodiments, which are not repeated hereinafter.

Figure 11:
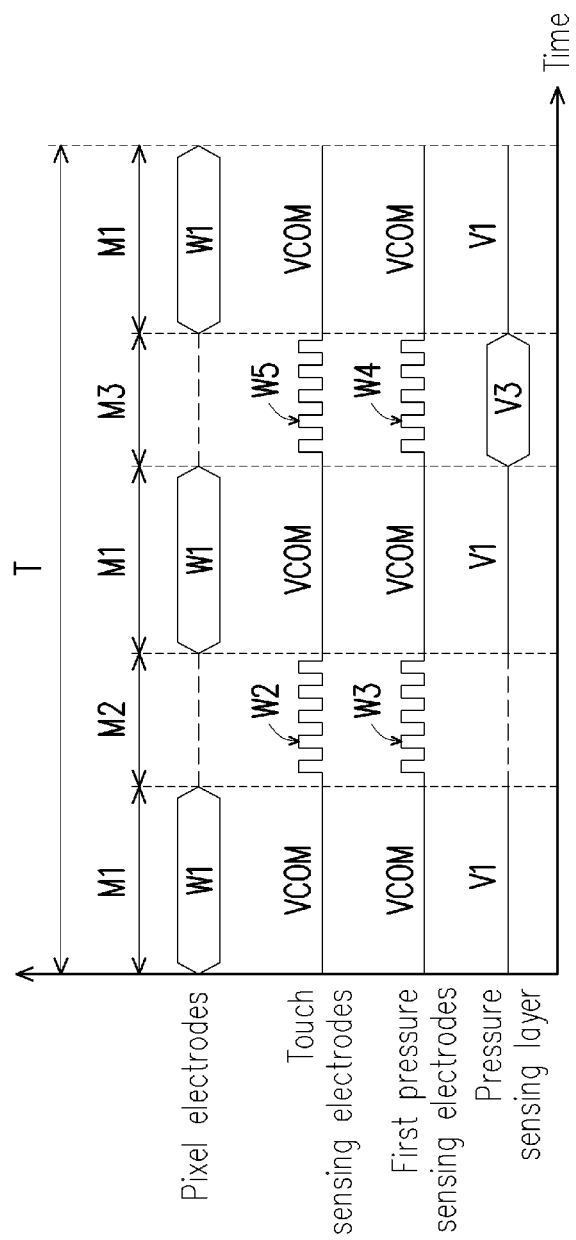

Referring to FIG. 11, during the frame period T, the display mode M1 may be performed three times, and each of the touch sensing mode M2 and the pressure sensing mode M3 may be performed once. Further, the display mode M1, the touch sensing mode M2 and the pressure sensing mode M3 are performed by time-division. A method of performing the display mode M1 may refer to the foregoing embodiment, which is not repeated hereinafter.

A method of performing the touch sensing mode M2 includes: floating the pressure sensing layer 124 (the floating state is represented in dotted lines); and providing a touch driving waveform (e.g., the driving waveform W2) to the touch sensing electrodes 114A (including the first touch sensing electrodes 114A1 and the second touch sensing electrodes 114A2). In this embodiment, the touch sensing electrodes 114A perform the touch sensing in a manner of self-capacitance, and thus providing the driving waveform to the touch sensing electrodes 114A means that the touch driving waveforms transferred to all the touch sensing electrodes 114A (including the first touch sensing electrodes 114A1 and the second touch sensing electrodes 114A2) are outputted by the control circuit 115 in FIG. 1D simultaneously. In another embodiment, a constant voltage V2 may also provided to the pressure sensing layer 124, wherein the constant voltage V2 and V1 may be identical or different.

Figure 12:
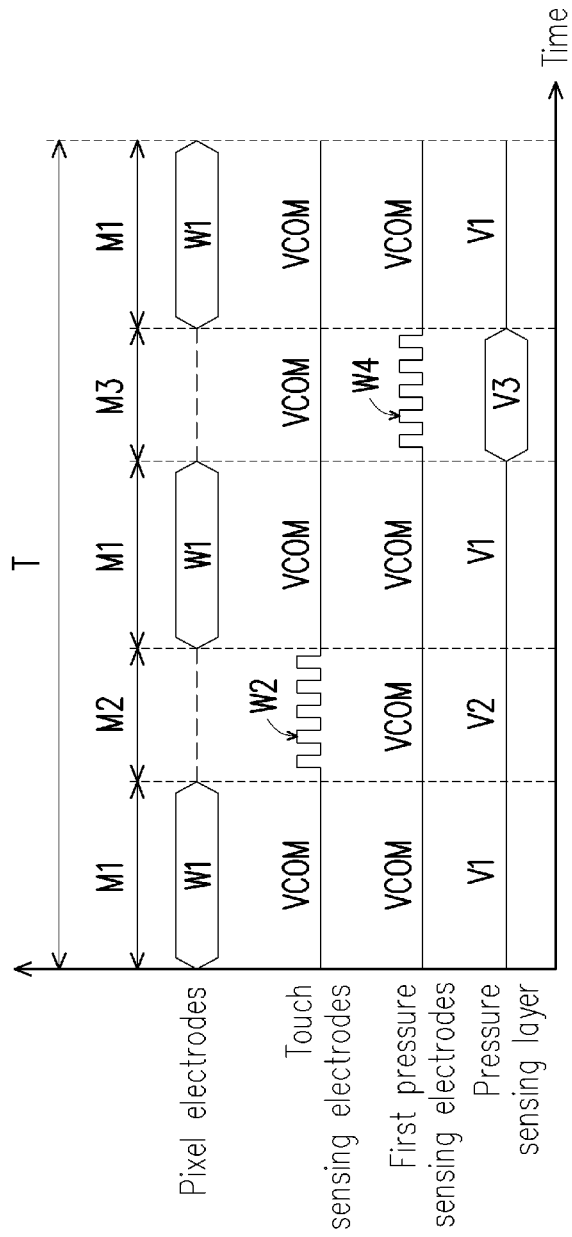

Further, the method of performing the touch sensing mode M2 may also include: providing a waveform (e.g., a driving waveform W3) with the same phase of the touch driving waveform (e.g., the driving waveform W2) to the first pressure sensing electrodes 114B, as shown in FIG. 11. In another embodiment, as shown in FIG. 12, the common voltage VCOM may also be provided to the first pressure sensing electrodes 114B. In yet another embodiment, the first pressure sensing electrodes 114B may also be floated.

A method of performing the pressure sensing mode M3 includes: providing a constant voltage V3 to the pressure sensing layer 124, wherein the constant voltage V3 is identical to or different from the constant voltages V1 and V2; providing a pressure sensing waveform W4 to the first pressure sensing electrodes 114B; and providing a waveform W5 with the same phase of the pressure sensing waveform W4 to the touch sensing electrodes 114A, wherein the waveform W5 and the pressure sensing waveform W4 may have the same or different levels, as shown in FIG. 11. In another embodiment, as shown in FIG. 12, the common voltage VCOM may also be provided to the touch sensing electrodes 114A. In yet another embodiment, the touch sensing electrodes 114A may also be floated.

Figure 13:
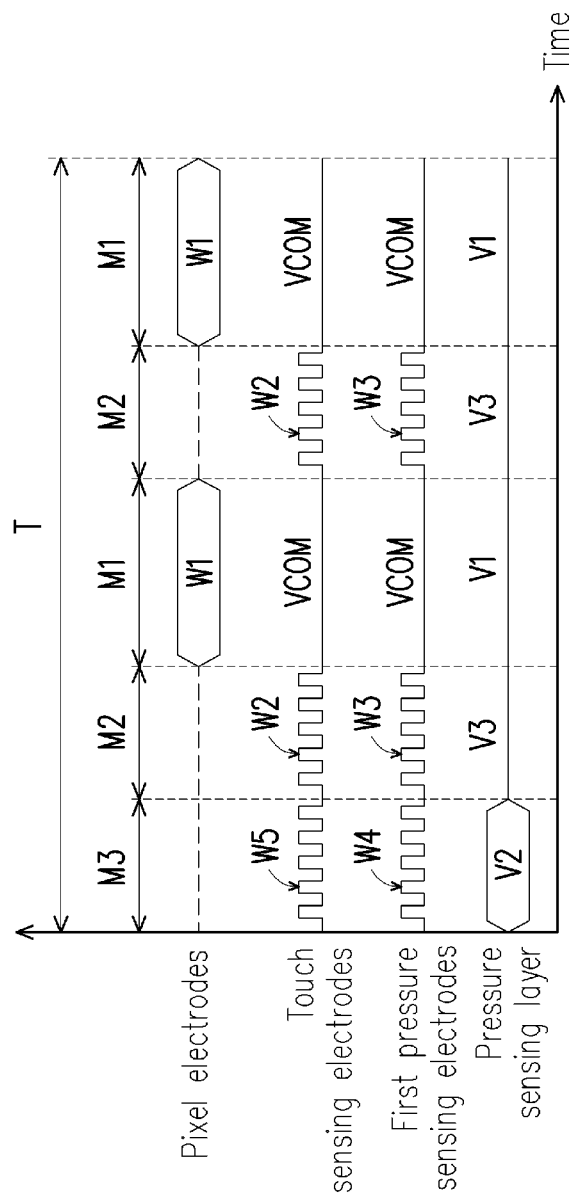
Figure 14:
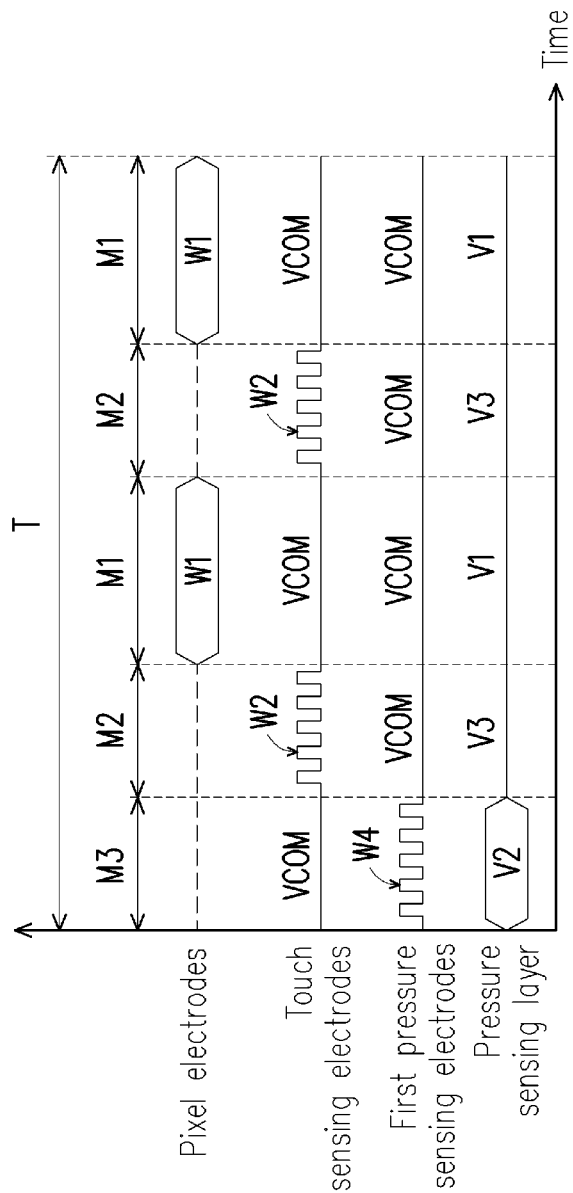

Referring to FIG. 13 and FIG. 14, during the frame period T, the touch sensing mode M2 and the pressure sensing mode M3 may have different reporting rates. Specifically, during the frame period T, each of the display mode M1 and the touch sensing mode M2 may be performed twice, and the pressure sensing mode M3 may be performed once. In addition, the display mode M1, the touch sensing mode M2 and the pressure sensing mode M3 may be performed by time-division. Method of performing the display mode M1, the touch sensing mode M2 and the pressure sensing mode M3 may refer to the foregoing embodiments, which are not repeated hereinafter.

Figure 15:
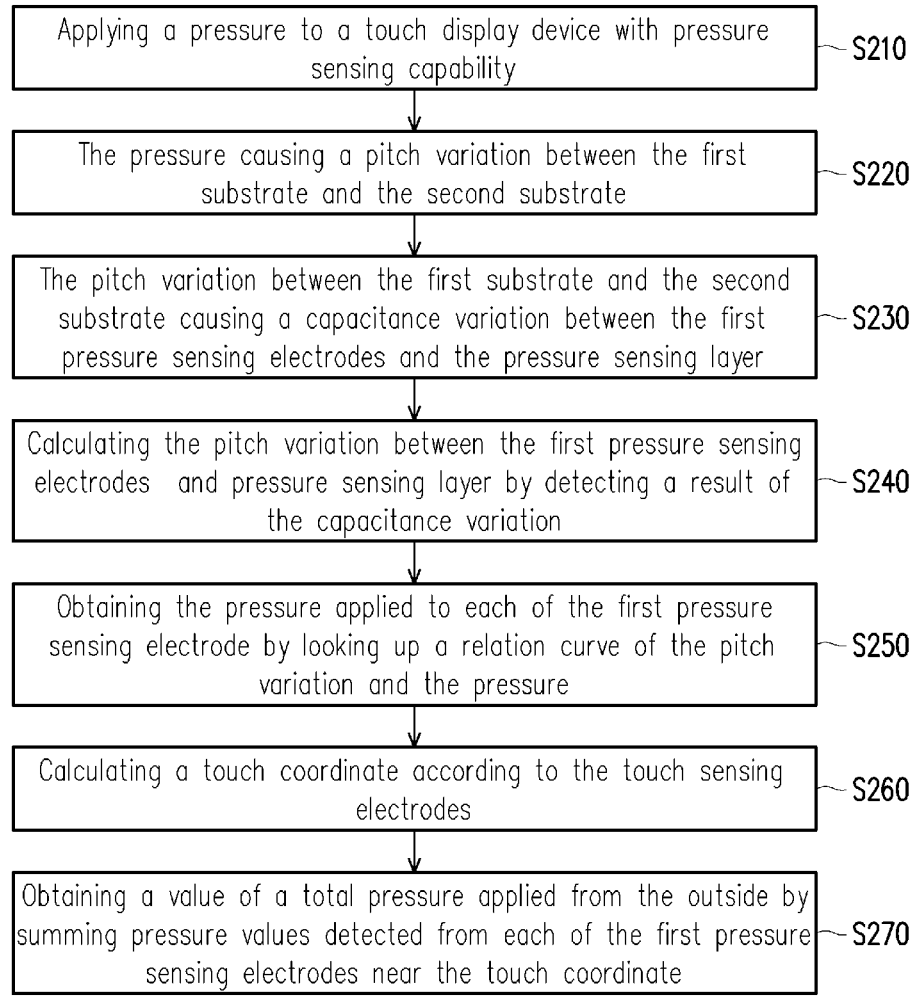
FIG. 15 is a flowchart of a pressure detection method of a touch display device according to an embodiment of the present invention.
Figure 16:
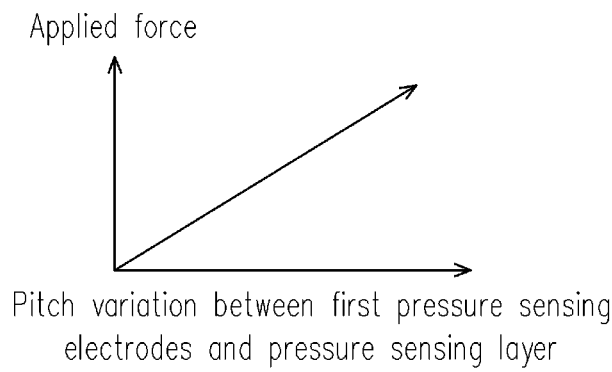
FIG. 16 is a schematic diagram illustrating a relation curve of the pitch variation and the pressure in FIG. 15.

A pressure detection method of a touch display device is described below with reference to FIG. 15 and FIG. 16. FIG. 15 is a flowchart of a pressure detection method of a touch display device according to an embodiment of the present invention. FIG. 16 is a schematic diagram illustrating a relation curve of the pitch variation and the pressure in FIG. 15. The pressure detection method of the touch display device includes the following steps. A touch display device (e.g., a touch display device 100 in FIG. 1A) is provided. The touch display device 100 includes a pixel array substrate 110, an opposite substrate 120 and a display medium layer 130. The pixel array substrate 110 includes a first substrate 112 and a plurality of sensing electrodes 114. The first substrate 112 has a plurality of sub-pixel areas SP arranged in array (referring to FIG. 1B). The sensing electrodes 114 include a plurality of touch sensing electrodes 114A and a plurality of first pressure sensing electrodes 114B. The touch sensing electrodes 114A are disposed on the first substrate 112 and electrically insulated from each other. Each of the touch sensing electrodes 114A covers a number of the sub-pixel areas SP. The first pressure sensing electrodes 114B is disposed on the first substrate 112 and electrically insulated from the touch sensing electrodes 114A. The first pressure sensing electrodes 114B are electrically insulated from each other and cover the sub-pixel areas SP exposed by the touch sensing electrodes 114A. The opposite substrate 120 is opposite to the pixel array substrate 110 and includes a second substrate 122 and a pressure sensing layer 124. The pressure sensing layer 124 is disposed on a surface of the second substrate 122 facing the pixel array substrate 110.

The display medium layer 130 is located between the sensing electrodes 114 and the pressure sensing layer 124. When a pressure is applied to the touch display device 100 (referring to FIG. 3), a pitch variation (e.g., changed from the pitch P into the pitch CP') between the first pressure sensing electrode 114B and the pressure sensing layer 124 is calculated according to a capacitance variation (e.g., changed from the capacitance CP into the capacitance CP') between each of the first pressure sensing electrodes 114B and the pressure sensing layer 124. The pressure applied to each of the first pressure sensing electrodes 114B at the corresponding position on the touch display device 100 is calculated according to the pitch variation.

FIG. 15 is one embodiment of the pressure detection method of the touch display device, but the invention is not limited thereto. Referring to FIG. 3, FIG. 15 and FIG. 16, when a pressure is applied to a touch display device with pressure sensing capability (e.g., the touch display device 100) by an object (step S210), the pressure will cause a pitch variation between the first substrate 112 and the second substrate 122 (step S220). The pitch variation between the first substrate 112 and the second substrate 122 will cause a capacitance variation between the first pressure sensing electrode 114B and the pressure sensing layer 124 (step S230). Accordingly, the touch display device 100 can calculate the pitch variation between the first pressure sensing electrode 114B and pressure sensing layer 124 by detecting a result of the capacitance variation (step S240). Next, the pressure applied to each of the first pressure sensing electrodes 114B is obtained by looking up a relation curve (referring to FIG. 16) of the pitch variation and the pressure (step S250). In FIG. 16, the pitch variation between the first pressure sensing electrodes 114B and the pressure sensing layer 124 is proportional to the applied pressure, and the relation curve of the pitch variation and the pressure is a straight line. However, based on different design parameters (e.g., stack structures, electrode pattern designs, properties of materials, etc.), the relation curve of the pitch variation and the pressure may also be a curved line or a broken line. In this embodiment, the touch display device may also calculate a touch coordinate (also a pressured coordinate) according to the touch sensing electrodes 114A (step S260). Further, a value of a total pressure applied from the outside may be obtained by summing pressure values detected from each of the first pressure sensing electrodes 114B near the touch coordinate (step S270). While summing the detected pressure values, weights of the pressure values detected from each of the first pressure sensing electrode 114B may be modulated according to a calibration curve set by the system, so as to satisfy different design requirements. Moreover, when more than one touch coordinate occurs, based on the same principle, the pressure values detected from each of the first pressure sensing electrodes 114B near the touch coordinates may be summed in order to obtain the value of the total pressure applied to each of the touch coordinates.

In summary, the touch display device according to one embodiment of the present invention is capable of determining the 2D touched coordinate and calculating the pressure applied to the touch display device by the sensing electrodes and the pressure sensing layer, so as to achieve the 3D touch sensing. In addition, the present invention further provides the driving method and the pressure detection method of the touch display device.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A touch display device, comprising:
   a pixel array substrate, comprising:
     a first substrate, having a plurality of sub-pixel areas arranged in array; and
     a plurality of sensing electrodes, disposed on the first substrate and electrically insulated from each other, wherein at least portion of the sensing electrodes cover a number of the sub-pixel areas, respectively;
   an opposite substrate, opposite to the pixel array substrate, and comprising:
     a second substrate; and
     a pressure sensing layer, disposed on a surface of the second substrate facing the pixel array substrate; and
   a display medium layer, located between the sensing electrodes and the pressure sensing layer,
   wherein the sensing electrodes comprise:
     a plurality of touch sensing electrodes, electrically insulated from each other, and each of the touch sensing electrodes covering the number of the sub-pixel areas; and
     a plurality of first pressure sensing electrodes, electrically insulated from the touch sensing electrodes, wherein the first pressure sensing electrodes are electrically insulated from each other and cover the sub-pixel areas exposed by the touch sensing electrodes.

2. The touch display device according to claim 1, wherein the pressure sensing layer comprises a plurality of second pressure sensing electrodes and a plurality of connection portions, each of the second pressure sensing electrodes disposed corresponding to one of the sensing electrodes, and the connection portions connecting the second pressure sensing electrodes.

3. The touch display device according to claim 2, wherein the touch sensing electrodes comprise a plurality of first touch sensing electrodes and a plurality of second touch sensing electrodes, the first touch sensing electrodes and the second touch sensing electrodes electrically insulated from each other and not overlapped with one another, each of the first touch sensing electrodes having an opening, and each of the first pressure sensing electrodes disposed in one of the openings.

4. The touch display device according to claim 3, wherein a ratio of an area of each of the first pressure sensing electrodes to an area of each of the first touch sensing electrodes falls within a range between 0.01% and 15%.

5. The touch display device according to claim 3, wherein a ratio of a total area of the first pressure sensing electrodes to a total area of the first touch sensing electrodes and the second touch sensing electrodes falls within a range between 0.01% and 15%.

6. The touch display device according to claim 3, wherein a ratio of an area of each of the second pressure sensing electrodes to an area of the corresponding first pressure sensing electrode falls within a range between 100% and 500%.

7. The touch display device according to claim 1, wherein the pixel array substrate further comprises:
   a control circuit, disposed on the first substrate;
   at least one conductor, disposed between the first substrate and the second substrate, and the at least one conductor electrically connected to the pressure sensing layer;

a plurality of first conductive lines, disposed on the first substrate, and each of the first conductive lines connecting one of the sensing electrodes to the control circuit; and at least one second conductive line, disposed on the first substrate, and each of the at least one second conductive line connecting one of the at least one conductor to the control circuit so that the pressure sensing layer is electrically connected to the control circuit.

8. The touch display device according to claim 7, wherein the control circuit comprises an integrated control circuit, configured to perform a display mode, a touch sensing mode and a pressure sensing mode.

9. A driving method of a touch display device, comprising:

providing a touch display device, the touch display device comprising a pixel array substrate, an opposite substrate and a display medium layer, the pixel array substrate comprising a first substrate and a plurality of sensing electrodes, the first substrate having a plurality of sub-pixel areas arranged in array, the sensing electrodes comprising a plurality of touch sensing electrodes and a plurality of first pressure sensing electrodes, the touch sensing electrodes disposed on the first substrate and electrically insulated from each other, each of the touch sensing electrodes covering a number of the sub-pixel areas, and the first pressure sensing electrodes disposed on the first substrate and electrically insulated from the touch sensing electrodes, wherein the first pressure sensing electrodes are electrically insulated from each other and cover the sub-pixel areas exposed by the touch sensing electrodes, and the opposite substrate is opposite to the pixel array substrate and comprises a second substrate and a pressure sensing layer, wherein the pressure sensing layer is disposed on a surface of the second substrate facing the pixel array substrate, and the display medium layer is located between the sensing electrodes and the pressure sensing layer, wherein the touch display device comprises a display mode, a touch sensing mode and a pressure sensing mode; and during a frame period, performing at least one of the display mode, the touch sensing mode and the pressure sensing mode, wherein during the frame period, the touch sensing mode and the pressure sensing mode are performed simultaneously, and a method of simultaneously performing the touch sensing mode and the pressure sensing mode comprises:

providing driving waveforms with the same phase to the touch sensing electrodes and the first pressure sensing electrodes.

10. The driving method of the touch display device according to claim 9, wherein the display mode, the touch sensing mode and the pressure sensing mode are performed by time-division.

11. The driving method of the touch display device according to claim 9, wherein during the frame period, the touch sensing mode and the pressure sensing mode are performed by time-division.

12. The driving method of the touch display device according to claim 9, wherein during the frame period, the touch sensing mode and the pressure sensing mode are performed simultaneously.

13. The driving method of the touch display device according to claim 9, wherein a method of performing the display mode comprises:

providing a common voltage to the first pressure sensing electrodes and the touch sensing electrodes; and floating the pressure sensing layer or providing a constant voltage to the pressure sensing layer.

14. The driving method of the touch display device according to claim 9, wherein a method of performing the touch sensing mode comprises:

floating the pressure sensing layer or providing a constant voltage to the pressure sensing layer; and providing a touch driving waveform to the touch sensing electrodes.

15. The driving method of the touch display device according to claim 14, wherein the method of performing the touch sensing mode further comprises:

floating the first pressure sensing electrodes or providing a waveform with the same phase of the touch driving waveform or a common voltage to the first pressure sensing electrodes.

16. The driving method of the touch display device according to claim 9, wherein a method of performing the pressure sensing mode comprises:

providing a constant voltage to the pressure sensing layer;

providing a pressure sensing waveform to the first pressure sensing electrodes; and floating the touch sensing electrodes or providing a common voltage or a waveform with the same phase of the pressure sensing waveform to the touch sensing electrodes.

17. A pressure detection method of a touch display device, comprising:

providing a touch display device, the touch display device comprising a pixel array substrate, an opposite substrate and a display medium layer, the pixel array substrate comprising a first substrate and a plurality of sensing electrodes, the first substrate having a plurality of sub-pixel areas arranged in array, the sensing electrodes comprising a plurality of touch sensing electrodes and a plurality of first pressure sensing electrodes, the touch sensing electrodes disposed on the first substrate and electrically insulated from each other, each of the touch sensing electrodes covering a number of the sub-pixel areas, and the first pressure sensing electrodes disposed on the first substrate and electrically insulated from the touch sensing electrodes, wherein the first pressure sensing electrodes are electrically insulated from each other and cover the sub-pixel areas exposed by the touch sensing electrodes, and the opposite substrate is opposite to the pixel array substrate and comprises a second substrate and a pressure sensing layer, wherein the pressure sensing layer is disposed on a surface of the second substrate facing the pixel array substrate, and the display medium layer is located between the sensing electrodes and the pressure sensing layer;

when a pressure is applied to the touch display device, calculating a pitch variation between the first pressure sensing electrodes and the pressure sensing layer according to a capacitance variation between each of the first pressure sensing electrodes and the pressure sensing layer;

calculating the pressure applied to each of the first pressure sensing electrodes at a corresponding position on the touch display device according to the pitch variation;

identifying at least one pressured coordinate by the touch sensing electrodes; and obtaining a pressure value applied to each of the at least one pressured coordinate by summing the pressures applied to the first pressure sensing electrodes surrounding respective one of the at least one pressure-applied coordinate.

* * * * *